May 6, 1924.
C. F. BERGQUIST
1,492,666
DIRECTION INDICATOR
Filed Aug. 16, 1923
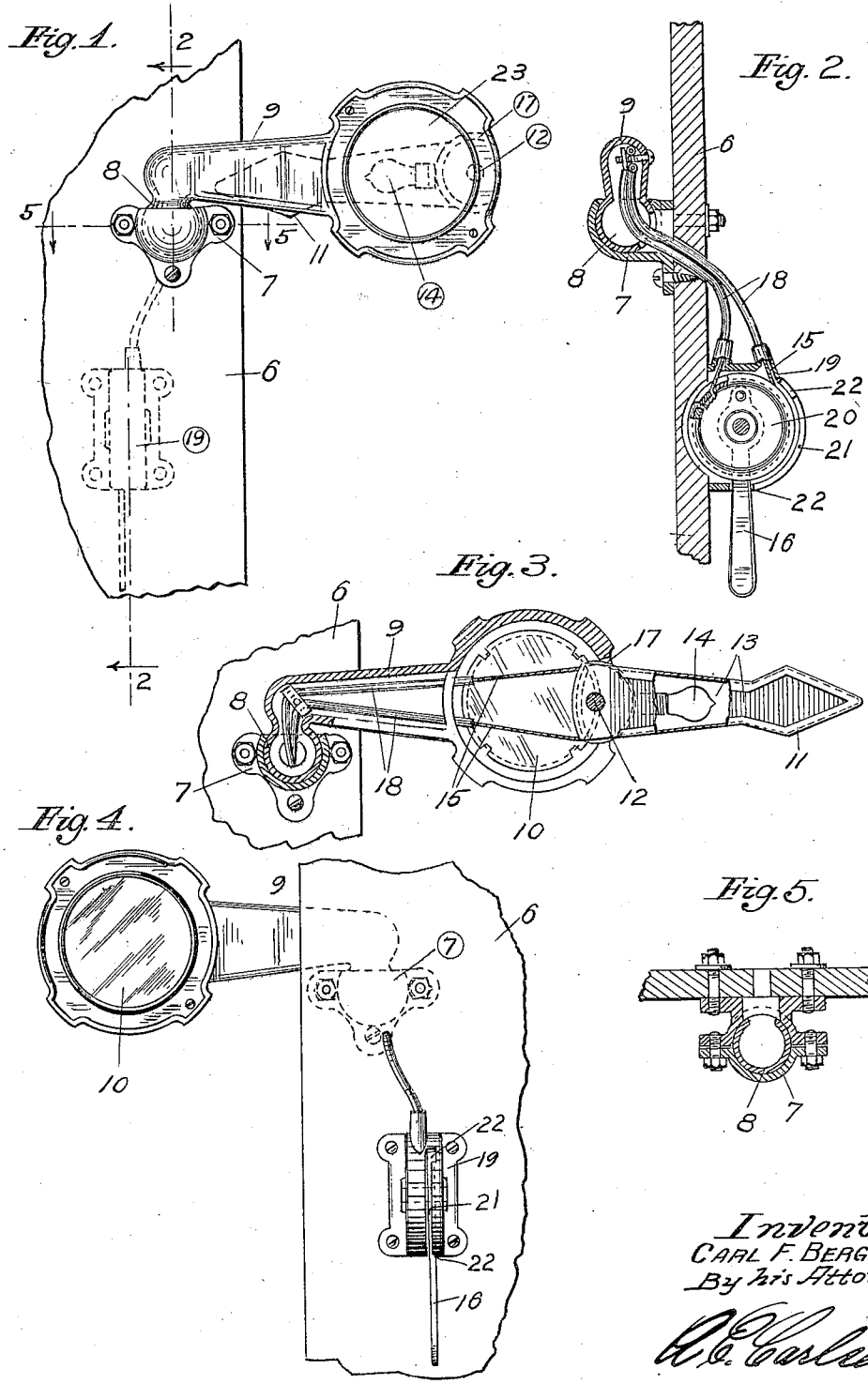
Inventor
CARL F. BERGQUIST
By his Attorney Patented May 6, 1924.

1,492,666

UNITED STATES PATENT OFFICE.

CARL F. BERGQUIST, OF MINNEAPOLIS, MINNESOTA, ASSIGNOR OF ONE-HALF TO NILS J. VELINE, OF MINNEAPOLIS, MINNESOTA.

DIRECTION INDICATOR.

Application filed August 16, 1923. Serial No. 657,766.

*To all whom it may concern:*

Be it known that I, CARL F. BERGQUIST, a subject of the King of Sweden, residing at Minneapolis, in the county of Hennepin and State of Minnesota, have invented certain new and useful Improvements in Direction Indicators, of which the following is a specification.

This invention relates to direction indicators for motor vehicles, and the main object is to provide an efficient, practical and attractive device for warning pedestrians and drivers of other cars, both in front and in the rear, that a turn is to be made by the car on which the device is secured. Further and more specific objects will be disclosed in the course of the following specification, the invention being illustrated in the accompanying drawing, in which:—

Fig. 1 is a front elevation of the device showing it as attached to the body of a motor vehicle.

Fig. 2 is a sectional elevation as seen substantially on the line 2—2 in Fig. 1.

Fig. 3 is a view similar to Fig. 1, but showing the indicator arm extended and the front portion of the body member broken away.

Fig. 4 is a rear view of the device.

Fig. 5 is a sectional detail as seen on the line 5—5 in Fig. 1.

Referring to the drawing more particularly and by reference characters 6 designates a portion of the body or windshield frame of an automobile, which portion may be any part of the car to which an indicator is best applied, but preferably near the driver side of the car and in front of the driver.

To the vehicle 6 I secure a socket member 7, in which is adjustably secured the ball 8 of a hollow body member 9. The rear of the body member 9 is provided with a mirror 10 (see Figs. 3 and 4) the position and angle of which can be readily adjusted, by the ball and socket connection, so that the driver of the car can see the reflection and actions of cars approaching from the rear.

The body member 9 is substantially hollow, and is open at its bottom and outer end to receive an indicator arm 11, which is pivotally mounted as at 12, and is preferably formed in the shape of an arrow, as shown. The arm 11 is hollow, and has its front and rear faces 13 made of red glass so that when the arm is extended and an electric light 14 within the arm is lit, then the proper signal will be given. The light 14 is connected in any suitable or conventional switch-controlled electric circuit (not shown).

The arm 11 is swung out into signalling position (Fig. 3) and back into its concealed position (Figs. 1 and 4) by means of a cable 15, actuated by a lever 16 which is located in any convenient position for the driver of the car to reach and manipulate. The cable is stretched over a sheave 17 on the arm 11, and extends through a pair of hollow wires or tubes 18, to a hollow bracket 19 within the car, where they are secured about a pulley 20, rotatable within the bracket. The lever 16 is secured to the pulley 20 and extends through a slot 21 in the bracket. Lateral notches 22 are provided at the ends of the slot 21 to receive the lever 16 and releasably retain it in either of its extreme positions. A front opening in the body member 9 is provided with a preferably translucent glass 23, behind which the light 14 will be positioned when the arm 11 is in concealed position, as indicated in Fig. 1. Thus the device may be used as a parking light, when the car is parked in a street or other public highway where parking lights are required at night, so that the regular lights of the car, with the exception of the tail light, may be turned off.

In direction indicators of this class, as developed heretofore, the common objection, especially by owners of expensive and well-kept cars, is the ugly and unsightly appearance of the indicating devices when they are not actually being used. This has been largely, if not entirely, overcome in the present construction, as the indicator arm is entirely concealed when not in use, and the body member 9, by being ornamentally designed, appears to be only a fanciful support for the mirror 10.

It is understood that suitable modifications may be made in the general design and structural details of the device, as herein disclosed, provided, however, that such modifications come within the spirit and scope of the appended claims. Having now, therefore, fully shown and described my invention what I claim to be new and desire to protect by Letters Patent is:

1. A device of the class described, consisting of a horizontally arranged hollow body member secured at its inner end to a motor vehicle, an indicator arm pivotally secured to the outer end of the body member and arranged to swing into the same and be concealed thereby, a light within the indicator arm, and a translucent glass arranged in the body member immediately in front of the light when the indicator arm is in said concealed position, and manually operated means to swing the arm into an extended position beyond the body member.

2. The combination in an indicating device, of a hollow body member having a ball at one end, a socket member adapted to receive and grip said ball, an indicator arm normally concealed within the body member and arranged to be extended therefrom, a flexible cable extending through the body member, ball and socket member, and adapted to move the indicator arm from its concealed to its extended position and back, and a hand lever for actuating the cable.

In testimony whereof I affix my signature.

CARL F. BERGQUIST.